US006807570B1

(12) United States Patent
Allen et al.

(10) Patent No.: US 6,807,570 B1
(45) Date of Patent: Oct. 19, 2004

(54) PRE-LOADING OF WEB PAGES CORRESPONDING TO DESIGNATED LINKS IN HTML

(75) Inventors: Michael John Allen, Endicott, NY (US); Michael Sloan Bomar, Endicott, NY (US); William Francis Phillips, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 08/785,912

(22) Filed: Jan. 21, 1997

(51) Int. Cl.[7] .............................................. G06F 13/00
(52) U.S. Cl. ..................................... 709/219; 707/500
(58) Field of Search .............................. 707/500, 501, 707/513, 531; 395/200.33, 200.49, 200.36; 709/203, 217, 218, 219, 232, 212

(56) References Cited

U.S. PATENT DOCUMENTS

| 5,530,852 A | * | 6/1996 | Meske, Jr. et al. ........... 707/513 |
| 5,572,643 A | * | 11/1996 | Judson .................... 395/200.48 |
| 5,737,619 A | * | 4/1998 | Judson ........................ 707/500 |
| 5,802,292 A | * | 9/1998 | Mogul .................... 395/200.33 |
| 5,903,727 A | * | 5/1999 | Nielsen ....................... 709/212 |

FOREIGN PATENT DOCUMENTS

| JP | PUPA06-110926 | 4/1994 | ........... G06F/15/40 |
| JP | PUPA08-287095 | 11/1996 | ........... G06F/17/30 |

OTHER PUBLICATIONS

Ari Luotonen et al., World–Wide Proxies, CERN, pp. 1–8, Apr. 1994.*
Venkata N. Padmanabhan, Improving Worl Wide Web Latency, University of California at Berkeley, Report No. UCB/CSD–95–875, pp. 1–24, May 1995.*

Gihan V. Dias et al., A Smart Internet Caching system, Internet Society, http://www.isoc.org/, pp. 1–14, Aug. 1996.*

Evangelos P. Markatos et al., A Top–10 Approach to Prefetching on the Web, http://www.ics.forth.gr/proj/arch~vlsi/www.html, pp. 1–15, Aug. 1996.*

SCSI Web Pages (4 pages), Browse Faster—Without Buying a New Modem, Gregg Keizer, Dec. 9. 1996.

Internet Performance Products Web Pages (6 pages), www-.peak–media.com/netjet/netjet.html, date unknown, author unknown.

ForeFront, Nov. 6, 1996, Web Whacker, http://www.ffg-.com/whacker.html, author unknown.

PC Magazine Web Page, Nov. 6, 1996, Internet user, Freeloader, author unknown http://www.pemag.com/iu/oflinestory/rv–freeload.htm.

e–Surf—Fort Wayne's First Electronic News Source, Nov. 6, 1996, Web City Express, Inc, author unknown.

* cited by examiner

*Primary Examiner*—Patrice Winder
(74) *Attorney, Agent, or Firm*—Arthur J. Samodovitz

(57) ABSTRACT

A web browser loads and displays a web page and reads the html of the web page to identify an entry for a link which is marked for pre-loading. Then, the web browser automatically pre-loads into memory another html and associated graphics files corresponding to this link. This automatic pre-loading occurs without the link being selected by a user of the web browser. If the user subsequently selects the link, then the corresponding html and associated graphics files will be available from local memory so there is little delay in fetching the html and associated graphics files.

20 Claims, 4 Drawing Sheets

PRE-LOADING OF WEB PAGES CORRESPONDING TO DESIGNATED LINKS IN HTML

BACKGROUND OF THE INVENTION

The invention relates generally to client computers on the World Wide Web (WWW) and deals more particularly with web browser programs.

The WWW is well known and comprises a multitude of computer servers, respective data bases and a network by which client computers can communicate with the servers and request and load the data. A server may directly manage its own data base and access other, remote data bases on behalf of a client user. The client typically includes a "web browser" program to provide a user interface to the WWW.

The server presents the data to the user as "web pages" and each web page is represented by a "URL" address. The URL comprises an access method/protocol such as http as a prefix, a server name or "home page" and the data type, if any, as a suffix. The server name typically includes a "domain name" which is the name of a company, educational institution or other organization that owns the server. There are different ways that a client can access a web page. If the client knows the server name and data type suffix, if any, the client can directly request the web page from the server. However, if the client only knows the server name, the client can address the server name, and in response, the server will present the "home page" for the server. For those web pages for which the user does not know at least the server name, there are different types of search engines, such as key word search engines and catalog search engines, to identify a server and/or web page of interest. The home page, as well as other web pages, typically include text or graphics which serve as links to other web pages. The links are sometimes called "hot links" or "click points", and when a user selects a link with a mouse, the web browser requests the web page from the server and then displays the web page upon receipt.

Whenever a web browser requests a web page from the server, either by a user specifying a URL or selecting a link, the web page is loaded to the client machine in the form of an html file. The html file comprises a specification of each component of the web page—text, graphics, the nature of the component and whether each text or graphic is a link to another web page. The format of the conventional html is an industry standard and is further defined in "HTML for Fun and Profit" by Mary E. S. Morris published in 1995 by SunSoft Press, A Prentice Hall title. In the case of text, the html defines the actual text and its location on the web page. However, in the case of graphics, the html does not define the graphics itself but instead specifies a pointer to other files remote from the client which actually define the graphics. Some of the graphics are complex. While the graphics add meaning to the web page and can serve as links, they are often time consuming to load especially if the graphics are complex. The time delay is caused by the slowness of the communication lines between the client and the server. Thus, after selecting a link, the user must wait for the corresponding html and graphics to be loaded, and this wait can be extensive.

A general object of the present invention is to provide a method and system for expediting access by a user to web pages referenced by links on another web page currently being viewed by the user.

SUMMARY OF THE INVENTION

The invention resides in a web browser which loads and displays a web page, and reads the html of the web page to identify an entry for a link which is marked for pre-loading. Then, the web browser automatically pre-loads into memory another html and associated graphics files corresponding to this link. This automatic pre-loading occurs without the link being selected by a user of the web browser. If the user subsequently selects the link, then the corresponding html and associated graphics files will be available from local memory so there is little delay in fetching the html and associated graphics files.

In accordance with one feature of the invention, if the user selects another link in the web page which is currently being displayed, the web page corresponding to this other link is not resident in local memory and the pre-loading is in-progress, then the web browser halts the pre-loading and instead loads the web page currently selected by the user.

DETAILED DESCRIPTION OF THE PREFERRED EMBODIMENTS

Figure 1:
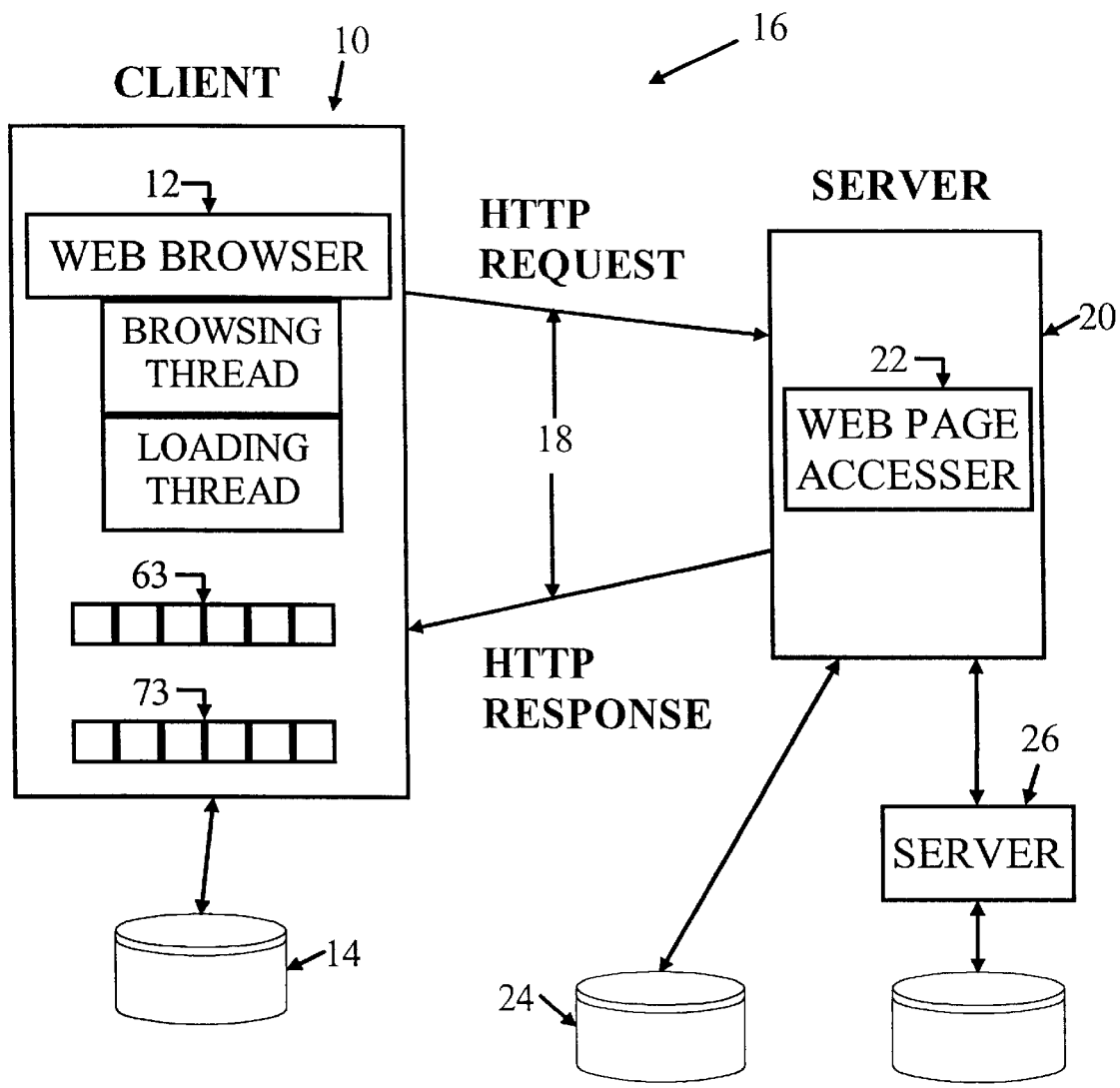
FIG. 1 is a block diagram of a client computer with a web browser according to the present invention, a server and networking which interconnects the client computer to the server.

Referring now to the drawings in detail wherein like reference numbers indicate like elements throughout, FIG. 1 illustrates a client computer generally designated 10 according to the present invention. Client computer 10 comprises a web browser program 12 and a memory 14 (RAM and/or DISK) to store web pages. Web browser 12 provides the user interface, communicates with the server to obtain web pages requested by a user and controls the display of web pages to the user. Client 10 is coupled to WWW 16 via a modem and communication lines 18 such as telephone or fiberoptics. The WWW includes a multitude of servers, such as server 20. Server 20 includes a web page accessor program 22 to access web pages from disk 24 on behalf of client 10 or request web pages from another server 26 on behalf of client 10. In the illustrated example, client 10 communicates with server 20 using http access method.

When server 20 supplies a web page to the client, the web page is defined by an html file which is embedded in the http communication. As explained in more detail below, an html according to the present invention designates for pre-loading certain of the web pages linked to this html. Immediately after the web browser loads the html and displays the corresponding web page, the web browser begins to pre-load into its memory 14 htmls and graphics corresponding to the designated links. Then, if the user subsequently selects one of these pre-loaded web pages via the respective links on the web page which is currently being displayed, the web browser can quickly fetch and display the web page from its local memory 14.

The following is an example of an html which was designed by a user according to the present invention:
33. <html>
35. <head>
37. <title>Patent Test Page</title>
39. </head>
41. <body>
43. <h3>Test Links</h3>

45. <ul>
47. <li><a href="http://www.test.com">Catalog</a>
49. <li><a href="http://www.test1.com" PRIORITY=1>Vacuum</a>
51. <li><a href="http://www.test2.com" PRIORITY=10>Carpet Shampooer</a>
53. </ul>
55. </body>

The first entry 33 "<html>" indicates that this file is an html. The next entry 35 "<head>" indicates page header. The next entry 37 begins with a tag "<title>" which indicates that the subsequent text is a title of the web page used for print job name and quicklist. The next entry 39 is the tag </head> which indicates end of page header. The next entry 41 indicates the body of the html page. The next entry 43 indicates a heading. The next entry 45 indicates an unordered list. The next entry 47 begins with <li> which means this is a list element, then includes tag "<a>" which means that the subsequent text "Catalog" is clickable to the specified URL "www.test.com". By way of example and not limitation, the "Catalog" web page is a text catalog of a manufacturer which owns the web page currently being viewed. Because the web page comprises text only and no graphics, the loading time is brief, and the designer of this web page did not perceive a need to designate this link for pre-loading. Thus, entry 47 is a standard, prior art html entry. The next entry 49 also begins with <li> which means list element, and then includes tag "<a>" which means that the subsequent text "Vacuum" is clickable to the specified URL "www.test1.com". By way of example and not limitation, the vacuum web page includes a picture and other information about a vacuum offered for sale by the manufacturer noted above. Therefore, the loading time is likely to be appreciable, and the designer of the web page perceived a need to pre-load this web page. In accordance with the present invention, entry 49 also includes a field "PRIORITY=1" which means that the html for URL "www.test1.com" should be pre-loaded soon after the web page corresponding to the foregoing html is displayed. This pre-loading occurs automatically without request by the user and without the user selecting the link corresponding to entry 49. The next entry 51 also begins with <li> which means list element, and then includes tag "<a>" which means that the subsequent text "Carpet Shampooer" is clickable to the specified URL "www.test2.com". By way of example and not limitation, the carpet shampooer web page includes a picture and other information about a carpet shampooer offered for sale by the manufacturer noted above, and the loading time is likely to be appreciable. Therefore, in accordance with the present invention, entry 51 also includes a field "PRIORITY=10" which means that the html for URL "www.test2.com" should be pre-loaded soon after the web page corresponding to the foregoing html is displayed. This pre-loading occurs automatically without request by the user and without the user selecting the link corresponding to entry 49. As explained in more detail below, the priority level determines the order of pre-loading the respective htmls. The next entry 53 indicates this is the end of an unordered list. The final entry 55 indicates this is the end of the html.

Figure 2:
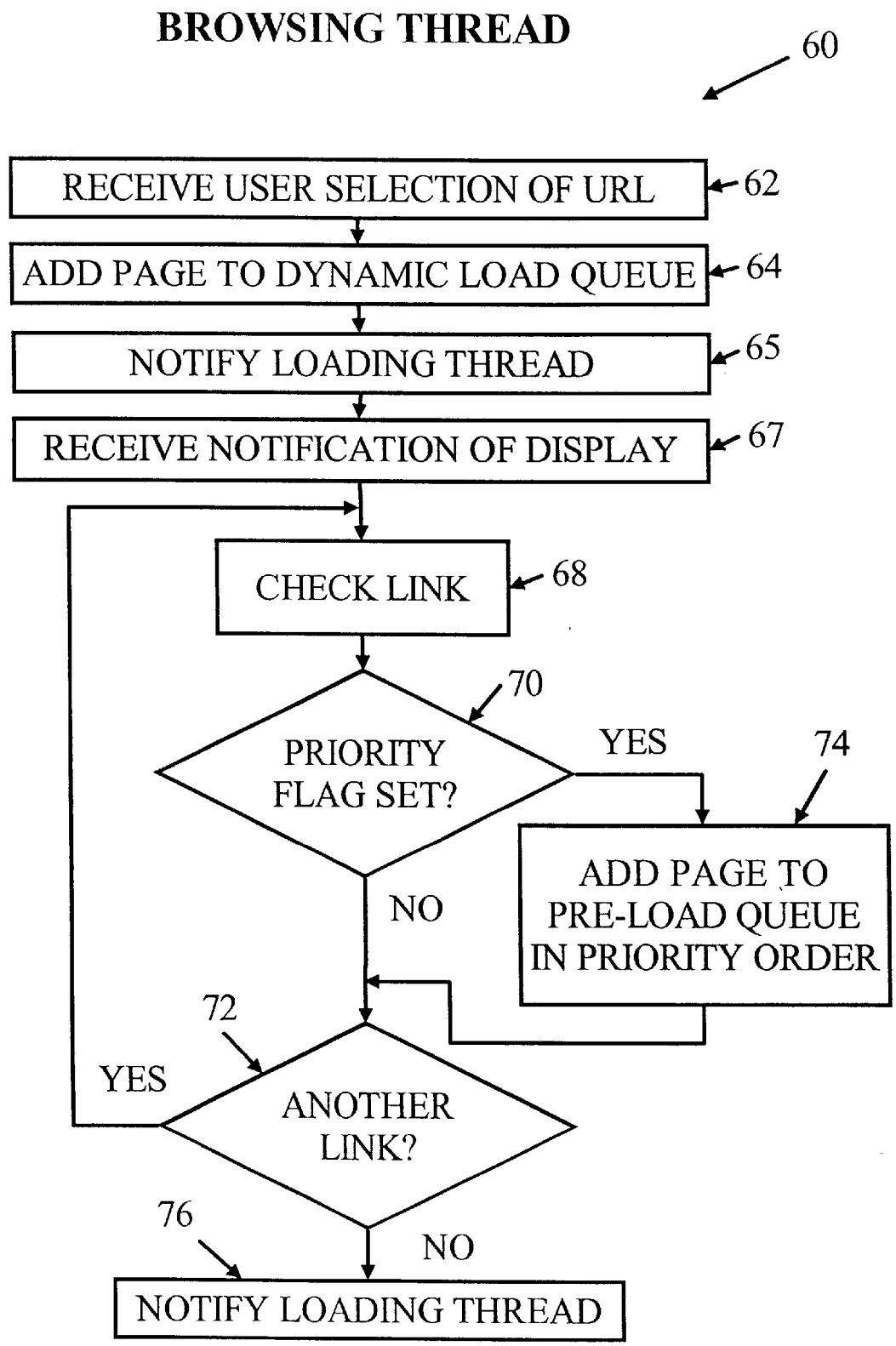
FIG. 2 is a flow chart illustrating processing by a browsing thread within the web browser of FIG 1.

FIG. 2 illustrates processing by a browsing thread 60 within the web browser program 12. In step 62, the browsing thread receives a user selection of a web page, either by URL or link. For purposes of explanation, assume that the first selection in step 62 is by URL and the URL represents html listed above. In response, the browsing thread adds the URL to a dynamic load queue 63 (illustrated in FIG. 1) (step 64) and sends a message to a loading thread 66 illustrated in FIGS. 3(a,b) indicating that the dynamic load queue should now be processed (step 65).

Figure 3A:
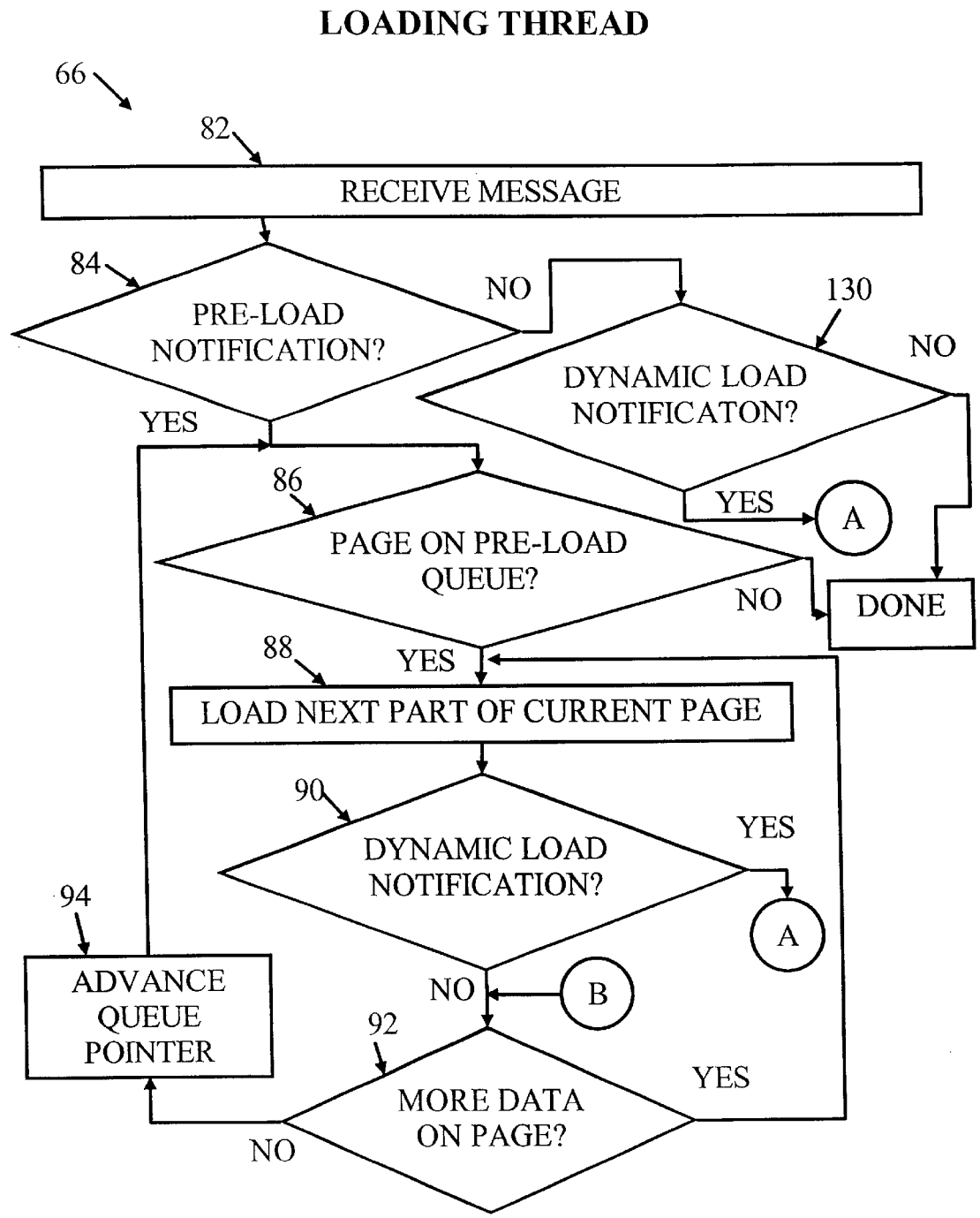
FIGS. 3(a,b) form a flow chart illustrating processing by a loading thread within the web browser of FIG. 1.
Figure 3B:
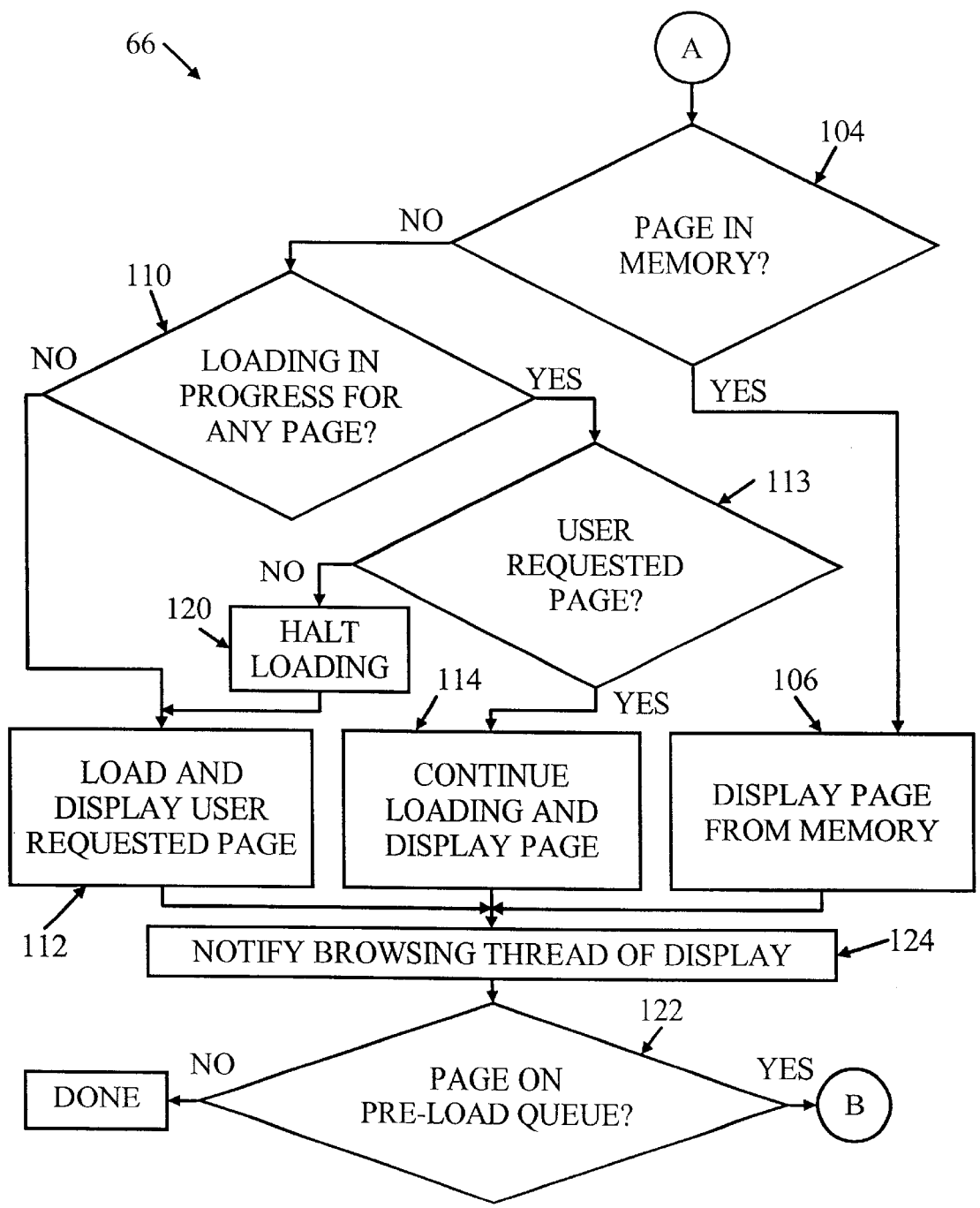

FIGS. 3(a,b) form a flow chart of the loading thread 66. Upon receipt of the message from the browsing thread 60 (step 82), the loading thread first determines that this message relates to processing of the dynamic load queue and not a pre-load queue 73 (illustrated in FIG. 1) (decisions 84 and 130). Then, the loading thread determines if the web page selected by the user currently resides in memory 14 (decision 104) as a result of a previous pre-load operation. (The pre-load operation is described below.) If so, the loading thread fetches and displays the web page from memory 14 (step 106). This occurs rapidly because the memory 14 is local. However, if the user-selected web page does not currently reside in memory 14, then the loading thread determines if any web page is currently in the process of being pre-loaded pursuant to a pre-load operation (decision 110). If not, then the loading thread requests the user-selected web page from the server, loads the user selected web page into memory 14 and then displays the user-selected web page (step 112). Referring again to decision 110, if any page is currently in the process of being pre-loaded pursuant to a pre-load operation, then the loading thread determines if this page is the user-selected web page (decision 113). If so, then the loading thread completes loading of the user selected web page and then displays the user selected web page (step 114). However, if a web page other than the user selected web page is currently being pre-loaded, then the loading thread halts pre-loading of this other web page (step 120), and then requests and loads the user-selected web page from the server and displays the user-selected web page (step 112). After either step 106, 112 or 114, the loading thread notifies the browsing thread that the web page on the dynamic load queue has been successfully loaded and displayed (step 124).

After receiving the notification of display from the loading thread (step 67), the browsing thread reads the html of the web page currently being displayed to locate any links in the web page currently being displayed that have a "priority" flag to indicate pre-loading (step 68). In the html listed above, there are two such links as defined by entries 49 and 51; however, the browsing thread first encounters the link defined by entry 47 which is not marked for pre-loading. Therefore, when encountering entry 47, decision 70 leads to decision 72 bypassing any pre-loading operation, and decision 72 leads back to step 68 to check the next entry 49. During this iteration, the browsing thread 60 encounters entry 49 which is marked with a priority flag to indicate pre-loading (decision 70). Consequently, the browsing thread adds the URL in entry 49 to a pre-load queue 73 in a position based on the priority level (step 74). The higher the priority level, the closer the URL is positioned toward the front of the queue. During the next iteration of steps 68 and 70, the browsing thread encounters entry 51 which also includes a "priority" flag indicating pre-loading, and the browsing function adds the URL in entry 51 to pre-load queue 73 (step 74). In the illustrated example, where entry 51 is marked with priority 10 and entry 49 is marked with priority 1, the URL in entry 51 is positioned in front of the URL in entry 49 in the pre-load queue. Because the browsing thread has now completed checking of all the links in the html listed above, the browsing thread notifies loading thread 66 that the pre-load queue should now be processed (step 76).

The loading thread 66 receives the notification message from the browsing thread to process the pre-load queue (step 82 and decision 84) and in response, determines the first URL on the pre-load queue (decision 86). Then, the loading thread requests the corresponding html and associated graphics from the server. As the loading thread receives and loads the html and associated graphics (step 88), the loading thread periodically checks for messages from the browsing thread. If no messages have been received (decision 90), the loading thread continues with the loading, i.e. determines if there is more data of the current html and associated graphics to load (decision 92) and if so, loops back to step 88 to load the next part of the html or associated graphics. However, if the loading thread has loaded the last part of the current html and associated graphics, then the loading thread determines if there is another URL on the pre-load queue (step 94 and decision 86), and then loops back to decision 86 to read this other URL. In the example described above where the displayed web page includes two web pages to be pre-loaded, then there are at least two entries on the pre-load queue.

Referring back to decision 90, if the loading thread receives a message from the browsing thread indicating that the user has selected a link for immediate display (decision 90), the loading thread determines if the user selected web page currently resides in memory 14 (decision 104). If so, the loading thread fetches and displays the web page from memory 14 (decision 106). However, if the user-selected web page does not currently reside in memory 14, then the loading thread determines if any web page is currently in the process of being loaded pursuant to a pre-load operation (decision 110). If not, then the loading thread requests the user-selected web page from the server, loads the user-selected web page into memory 14 and then displays the user-selected web page (step 112). Referring again to decision 110, if any page is currently in the process of being pre-loaded pursuant to a pre-load operation, then the loading thread determines if this page is the user-selected web page (decision 113). If so, then the loading thread completes loading of the user-selected web page and then displays the user-selected web page (step 114). However, if a web page other than the user-selected web page is currently being pre-loaded, then the loading thread halts pre-loading of this other web page (step 120), and then requests and loads the user-selected web page from the server and displays the user-selected web page (step 112).

After steps 106, 112 or 114, the loading thread notifies the browsing thread that the web page selected by the user for immediate display has been displayed. Also, the loading thread determines if there is a page on the pre-load queue yet to be completely pre-loaded (decision 122). If so, the loading thread continues processing with decision 92, but if not, the loading thread terminates.

Based on the foregoing, a web browser according to the present invention has been disclosed. However, numerous modifications and substitutions can be made without deviating from the scope of the present invention. For example, if desired, the web browser may give the user the option to prevent pre-loading altogether, or to prevent pre-loading of lower priority levels of pre-loads, such as all priority levels lower than five. Therefore, the present invention has been disclosed by way of illustration and not limitation and reference should be made to the following claims to determine the scope of the present invention.

What is claimed is:

1. A client web browser comprising:
   means for reading an html to identify an entry for a link which is marked for pre-loading; and
   means, responsive to identification of said link marked for pre-loading, for automatically loading another html and associated graphics, if any graphics, corresponding to said link into a memory device local to said client web browser, said automatic loading occurring without said link being selected by a user of said client web browser.

2. A web browser as set forth in claim 1 further comprising:
   means, responsive to selection by said user of said link after said other html and associated graphics are pre-loaded into said memory device, for fetching said other html and associated graphics from said memory and displaying a web page corresponding to said other html and associated graphics.

3. A web browser as set forth in claim 1 further comprising means for loading the first said html from a server and displaying a web page corresponding to said first html and associated graphics, if any graphics.

4. A web browser as set forth in claim 1 wherein said link marked for pre-loading is marked for pre-loading in an entry for said link in the first said html.

5. A web browser as set forth in claim 1 further comprising:
   means, responsive to selection by said user of another link in a web page which is currently displayed and corresponds to the first said html, for halting pre-loading of said other html and associated graphics, if any graphics, and loading an html corresponding to said other link, said selection by said user of said other link occurring while said other html and associated graphics, if any graphics, are being pre-loaded.

6. A client web browser as set forth in claim 1 wherein the first said html includes at least one other link which is not marked for pre-loading, and the automatic loading means does not pre-load an html for said one other link.

7. A client web browser as set forth in claim 1 wherein the first said html including the mark for pre-loading said link was defined by a human.

8. A client web browser comprising:
   means for reading a web page descriptor file to identify an entry for a link which is marked for pre-loading; and
   means, responsive to identification of said link marked for pre-loading, for automatically loading another web page descriptor file and associated graphics, if any graphics, corresponding to said link into a memory device local to said client web browser, said automatic loading occurring without said link being selected by a user of said client web browser.

9. A web browser as set forth in claim 8 further comprising:
   means, responsive to selection by said user of said link after said other web page descriptor file and associated graphics are pre-loaded into said memory device, for fetching said other web page descriptor file and associated graphics from said memory and displaying a web page corresponding to said other web page descriptor file and associated graphics.

10. A web browser as set forth in claim 8 further comprising:
    means, responsive to selection by said user of another link in a web page which is currently displayed and corresponds to the first said web page descriptor file, for halting pre-loading of said other web page descriptor file and associated graphics, if any graphics, and loading a third web page descriptor file corresponding to said other link, said selection by said user of said other link occurring while said first web page descriptor file and associated graphics, if any graphics, are being pre-loaded.

11. A client web browser as set forth in claim 8 wherein the first said html includes at least one other link which is not marked for pre-loading, and the automatic loading means does not pre-load an html for said one other link.

12. A method for operating a client computer coupled to a world wide web (WWW), said method comprising the steps of:

reading an html to identify an entry for a link which is marked for pre-loading; and in response to identification of said link marked for pre-loading, automatically loading another html and associated graphics, if any graphics, corresponding to said link from a remote memory device on said WWW into a memory device local to said client computer, said automatic loading occurring without said link being selected by a user of said client computer.

13. A method as set forth in claim 12 further comprising the steps of:

in response to selection by said user of said link after said other html and associated graphics are pre-loaded into said memory device, fetching said other html and associated graphics from said memory and displaying a web page corresponding to said other html and associated graphics.

14. A method as set forth in claim 12 further comprising the steps of:

in response to selection by said user of another link in a web page which is currently displayed and corresponds to the first said html, halting pre-loading of said other html and associated graphics, if any graphics, and loading an html corresponding to said other link, said selection by said user of said other link occurring while said other html and associated graphics, if any graphics, are being pre-loaded.

15. A method as set forth in claim 12 wherein the first said html includes at least one other link which is not marked for pre-loading, and an html for said one other link is not pre-loaded.

16. A method as set forth in claim 12 further comprising the step of a human creator of the first said html marking said link for pre-loading, said marking step being performed before the step of reading the first said html.

17. A computer program product for operating a client computer coupled to a world wide web (WWW), said program product comprising:

a computer readable medium;

first program instruction means for instructing a processor to read an html to identify an entry for a link which is marked for pre-loading; and second program instruction means for instructing a processor to respond to identification of said link marked for pre-loading, by automatically loading another html and associated graphics, if any graphics, corresponding to said link from a remote memory device on said WWW into a memory device local to said client computer, said automatic loading occurring without said link being selected by a user of said client computer; and wherein said first and second program instruction means are recorded on said medium.

18. A program product as set forth in claim 17 further comprising:

third program instruction means for instructing a processor to respond to selection by said user of said link after said other html and associated graphics are pre-loaded into said memory device, by fetching said other html and associated graphics from said memory and displaying a web page corresponding to said other html and associated graphics; and wherein said third program instruction means is recorded on said medium.

19. A method as set forth in claim 17 further comprising:

fourth program instruction means for instructing a processor to respond to selection by said user of another link in a web page which is currently displayed and corresponds to the first said html, by halting pre-loading of said other html and associated graphics, if any graphics, and loading an html corresponding to said other link, said selection by said user of said other link occurring while said second html and associated graphics, if any graphics, are being pre-loaded.

20. A computer program product as set forth in claim 17 wherein the first said html includes at least one other link which is not marked for pre-loading, and the second program instruction means does not instruct a processor to pre-load an html for said one other link.

* * * * *